Nov. 5, 1968 — T. D. LODE — 3,409,891

SURFACE ANTENNA

Filed Sept. 20, 1965 — 2 Sheets-Sheet 1

INVENTOR
TENNY D. LODE

United States Patent Office 3,409,891
Patented Nov. 5, 1968

3,409,891
SURFACE ANTENNA
Tenny D. Lode, Madison, Wis., assignor to Rosemount Engineering Company, Minneapolis, Minn., a corporation of Minnesota
Filed Sept. 20, 1965, Ser. No. 488,691
4 Claims. (Cl. 343—708)

ABSTRACT OF THE DISCLOSURE

Antenna constructions on a metal conducting sheet such as a portion of the outer metal skin of an aircraft. The constructions have resistive or magnetic isolation means attached to the surface which partially isolates an area of the metal sheet with respect to surface currents in the sheet. The isolated area is connected to a transmission cable and serves as the antenna receiving and/or radiating surface.

---

This invention relates to antennas for radio communication and other purposes. More particularly, it relates to antennas which are especially suited for use on aircraft and other vehicles.

The design and construction of aircraft antennas presents problems which are not usually encountered with other types of antennas. An aircraft antenna should, of course, be reasonably efficient as an electromagnetic wave radiator or receiver. In addition, it should be mechanically stable at the expected operating air speeds and not have excessively high aerodynamic drag. Ice accumulation may also be a problem in some circumstances. Most modern aircraft have metal outer skins. Because of the shielding effect of this metal skin, an effective antenna cannot be inside of the aircraft. The antennas must be either outside of the metal skin, or within or near one or more openings cut into the metal skin.

Most aircraft used for commercial or business purposes carry a number of individual antennas for multiple transmitters, multiple receivers and various frequency ranges. For example, a light twin aircraft of the type commonly used for business transportation may carry ten individual antennas. Transport type aircraft may carry as many or more individual antennas of various types.

An object of the present invention is to provide methods and means for the construction of novel forms of electromagnetic wave antennas. A further object is to allow the construction of antennas which will be particularly suited for use on aircraft and other vehicles. Additional objects may be seen by reference to the drawings and to the specification and the claims.

In a particular form of this invention, a ring of a material wth a high skin impedance is used to electrically isolate a surface area of a metal sheet. The isolated area is driven by an alternating current source and serves as an electromagnetic wave radiating element. Alternatively, it may be used as a receiving antenna driving a load circuit. This form of the invention is illustrated in FIGURE 1 and will be described in greater detail.

Figure 1:
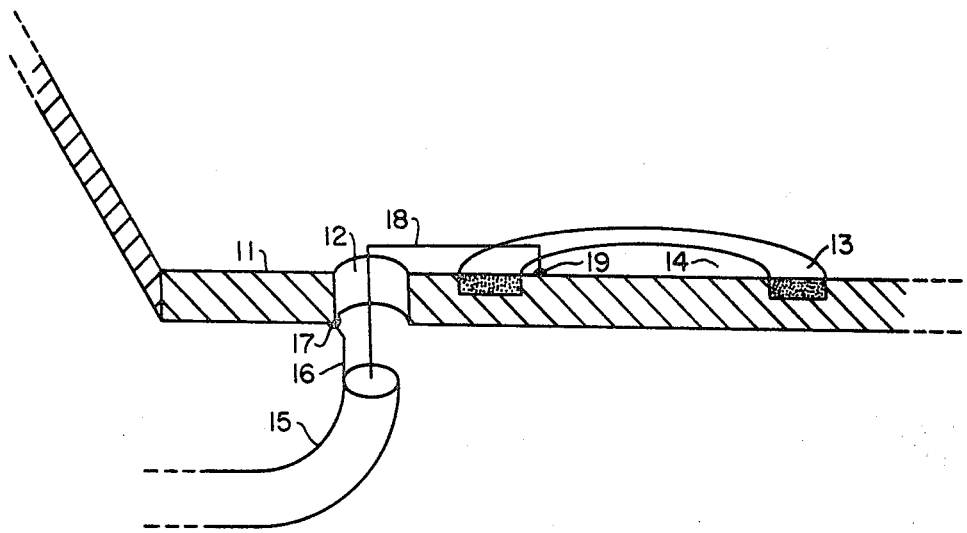
FIGURE 1 is a section view and pictorial illustration of a first form of the invention, showing the electrical isolation of a portion of a metal surface with a ring of suitable material.

Referring now to the drawings, FIGURE 1 includes metal sheet 11 with hole 12. Metal sheet 11 is assumed to be, for example, the outer skin of an aircraft or other vehicle. Ring 13 is of a material with a relatively high skin impedance. As will be explained later, ring 13 provides electrical isolation of area 14 of the outer surface of sheet 11. The outer or ground conductor of coaxial cable 15 connects via line 16 to sheet 11 at point 17. The central conductor of cable 15 connects via line 18 through hole 12 and to isolated area 14 at point 19.

It is well known that alternating currents passing through a conductor of simple shape tend to concentrate near the surface. The "skin depth" $d$ is given by the expression $$d = \frac{1}{\sqrt{\pi f m/r}}$$

where $f$ is the frequency, $m$ the magnetic permeability and $r$ the resistivity of the material. If the curvature of the conductor is large with respect to the skin depth, the current density will decrease exponentially with distance from the surface reaching a magnitude of $1/e$ times the surface value at a distance equal to the skin depth. If the alternating current surface resistance of the conductor is measured, the value will correspond to that of a layer whose thickness is substantially equal to the skin depth. The apparent surface resistance of this layer will be $$R_s = \sqrt{\pi f m r}$$

where $R_s$ is the apparent surface resistance in ohms per square. This quantity has only the dimension of resistance and does not include dimensions of length or mass.

FIGURE 1 illustrates a method for using the electromagnetic skin effect to partially isolate an area of the exterior skin of an aircraft (as far as high frequency currents are concerned) by surrounding that area with a ring of high skin-resistance material. Metal sheet 11 is assumed to be of a metal such as aluminum which has a low permeability, a low resistivity and a relative low alternating current surface resistance. Ring 13 is of a material with a higher resistivity and/or magnetic permeability such that its AC surface resistance is high with respect to that of metal sheet 11. The flow of high frequency alternating current from area 14 to and from the surface of sheet 11 outside of ring 13 will then be inhibited. For a particular frequency, the apparent impedance between area 14 and the remainder of sheet 11 will be determined largely by the shape and other characteristics of ring 13. Area 14 is thus a partially isolated conducting element and may be used as a radiator or receiver of electromagnetic waves. Coaxial line 15 is connected to a transmitter and/or receiver, depending on whether the structure of FIGURE 1 is used as a transmitting and/or receiving antenna.

Ring 13 is shown recessed into sheet 11 so as to present a smooth and uniform top surface. Similar results would be obtained if ring 13 were not recessed but simply placed on top of the surface of sheet 11. In practice, it will be desirable to have close electrical contact between ring 13 and sheet 11 along their entire common boundary. This is to insure that the effective electrical surface of the composite structure in the neighborhood of ring 13 is the surface of ring 13 rather than the boundary between ring 13 and sheet 11.

Figure 2:
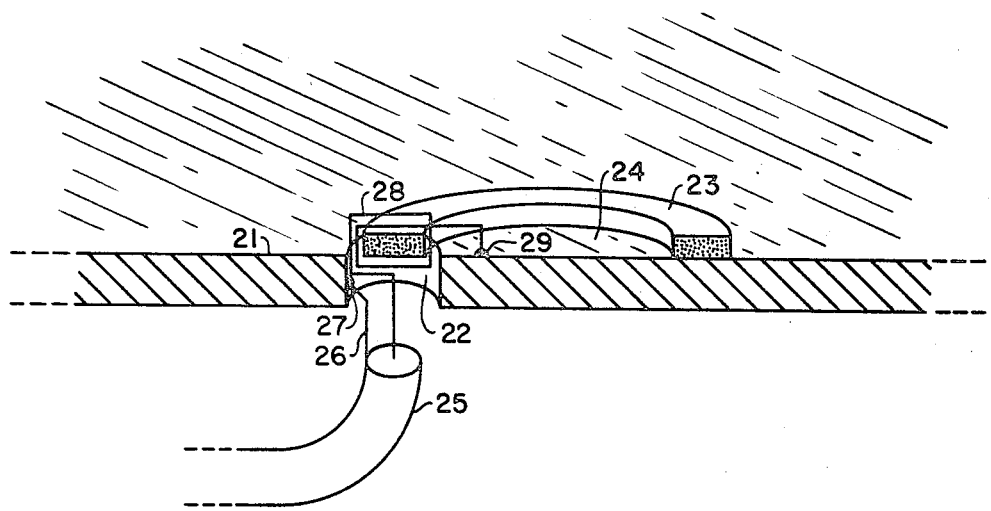
FIGURE 2 is an illustration of a second form of the invention, showing the use of a ring of ferromagnetic material for the isolation of an area of a metal surface and electromagnetic coupling to said ring.

Reference is now made to FIGURE 2 which illustrates a second form of the invention in which a ring of high permeability material is employed to isolate a portion of the surface of a metal sheet. In FIGURE 2, metal sheet 21 includes hole 22. Ring 23 of high permeability material is attached to the outer surface of sheet 21 and passes over hole 22. Ring 23 surrounds and effectively isolates area 24 of the outer surface of sheet 21. The outer or ground conductor of coaxial cable 25 connects via line 26 to sheet 21 at point 27. The central conductor of cable 25 connects to line 28, which passes around ring 23 and then connects to the surface of area 24 at point 29.

Ring 23 is of a high permeability material such as ferrite. High frequency currents flowing radially under ring 23 will generate an alternating magnetic field in ring 23 which will induce an opposing voltage in the surface of sheet 21. The net result will be to increase the apparent inductive impedance (for radial currents) of the surface of sheet 21 under and near high permeability ring 23. Current lead 28 is wrapped around ring 23 several times so as to achieve a transformer action in addition to delivering current to or from isolated area 24.

If the structure of FIGURE 2 is used as a transmitting antenna, coaxial cable 25 will be connected to a suitable radio transmitter. If it is used as a receiving antenna, cable 25 will be connected to a suitable receiver. The transformer action of ring 23 will aid the transfer of energy between currents in the surface of sheet 21 and currents in line 28 and cable 25.

Figure 3:
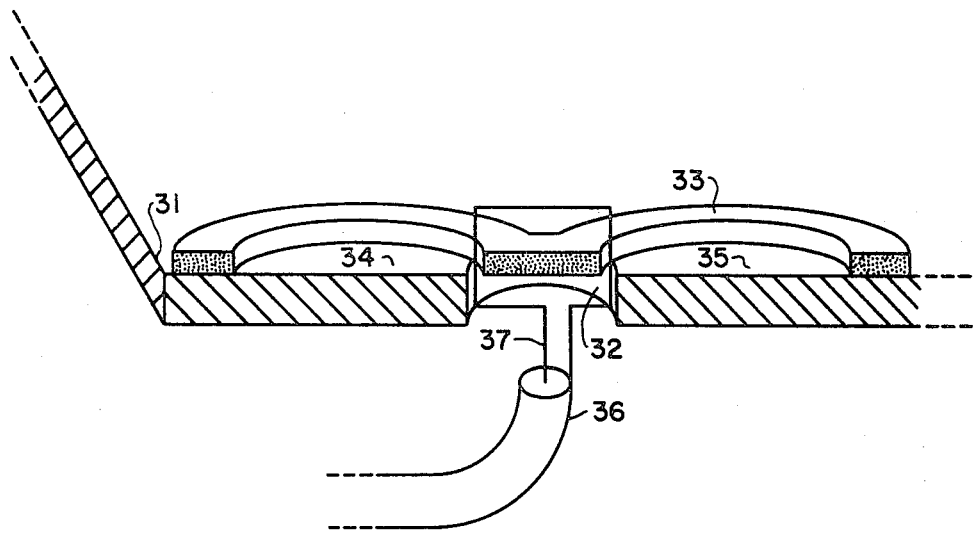
FIGURE 3 is an illustration of a third form of the invention, showing the use of ferromagnetic isolation elements and the coupling of a generating or load circuit thereto by entirely electromagnetic means.

Reference is now made to FIGURE 3 which is an illustration of a third form of the invention, showing the use of ferromagnetic isolation elements and the coupling of a generating or load circuit thereto by entirely electromagnetic means. In FIGURE 3, metal sheet 31 includes hole 32. Double ring 33 of a relatively high permeability ferromagnetic material, such as ferrite, passes over hole 32. Double ring 33 is in the shape of a figure "eight" and surrounds and isolates areas 34 and 35 of the outer surface of sheet 31. Coaxial cable 36 is terminated by line 37 which passes from the central conductor of cable 36 around double ring 33 and back to the outer, or ground conductor of cable 36.

The structure of FIGURE 3 generally resembles the structure of FIGURE 2 except for the use of a double isolating ring and entirely electromagnetic coupling to coaxial cable 36. If the structure of FIGURE 3 is used as a transmitting antenna, coaxial cable 36 will be connected to a suitable radio transmitter, and high frequency current flowing through line 37 will induce high frequency alternating magnetic flux through the two rings of double ring 33. The outer surface of metal sheet 31 will then act as a transformer secondary winding. Radial currents will be induced to flow in opposite phase in and out of isolated areas 34 and 35 giving rise to electromagnetic radiation. When the structure of FIGURE 3 is used as a receiving antenna, the process will be reversed. That is, currents in the outer surface of sheet 31 due to incident electromagnetic waves will induce an alternating magnetic flux in double ring 33 which will transfer energy to line 37 and coaxial cable 36.

Figure 4:
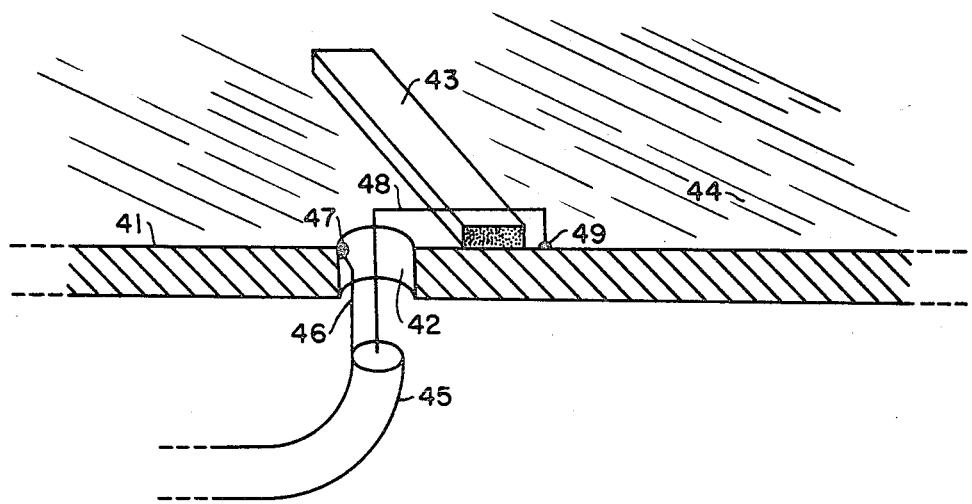
FIGURE 4 is an illustration of a fourth form of the invention showing the use of an isolating bar.

Reference is now made to FIGURE 4 which is an illustration of a fourth form of the invention showing the use of an isolating bar.

In FIGURE 4, metal sheet 41 includes hole 42. Bar 43, of a relatively high magnetic permeability and/or high resistivity material is placed on the outer surface of sheet 41. The placement of bar 43 partially isolates area 44 of the outer surface of sheet 41 from the vicinity of hole 42. The outer conductor of coaxial cable 45 connects via line 46 to sheet 41 at point 47. The central conductor of coaxial cable 45 connects via line 48 to area 44 at point 49. In use, coaxial cable 45 will be connected to a transmitter and/or receiver depending on whether the structure of FIGURE 4 is used as a transmitting and/or receiving antenna.

The structure of FIGURE 4 differs from the structures of FIGURES 1, 2 and 3 in that bar 43 does not enclose a particular area on the surface of sheet 41 but rather modifies the direction of current flow thereon. The presence of bar 43 will inhibit the flow of current between area 44 and hole 42. Hence, if alternating currents are delivered to area 44 by line 48, a significant alternating voltage difference will arise between area 44 and hole 42 giving rise to electromagnetic radiation. If the structure of FIGURE 4 is used as a receiving antenna, the presence of bar 43 will inhibit the normal flow of induced current on the outer surface of sheet 41 leading to the establishment of a significant alternating voltage difference between area 44 and hole 42.

Bar 43 may inhibit or modify current flow in the surface of sheet 41 in one or both of two ways. If bar 43 is of a ferromagnetic material with a relatively high permeability, there will be an inhibition of current flow due to magnetic induction effects. If bar 43 is of a material with a relatively high surface resistance, and is well bonded to the surface of sheet 41, current flow will be inhibited by skin or surface resistance effects.

The drawings have shown the use of rings and bars for inhibiting and otherwise influencing the flow of alternating current on the surface of a metal conductor. Squares, rectangles and many other shapes which may be open or closed may also be used within the spirit of this invention.

The preceding description has referred to surfaces of metal sheets. Antenna structures of the type shown and described may also be formed with other conducting surfaces which may or may not be metal.

The term "radio apparatus" in the claims is intended to include radio transmitting and/or receiving apparatus.

What is claimed is:

1. An electromagnetic antenna comprising a conducting sheet forming a portion of the outer skin of a vehicle, the sheet having relatively low permeability and having a hole between an inner surface and an outer surface, an extended element of relatively high permeability material attached to the outer surface in closely coupled relation thereto so that electrical current in the outer surface will be opposed through magnetic induction in the extended element thereby defining a first conducting surface area on one side of the element and a second conducting surface area on the other side of the element, and cable means having a first conductor connected to the first conducting surface area adjacent the element and a second conductor extending through the hole and connected to the second conducting surface area adjacent the element.

2. An electromagnetic antenna comprising a metal conducting sheet of relatively low permeability material having an outer surface, a ring of relatively high permeability material attached to the outer surface to provide close inductive coupling with the outer surface thereby enclosing an outer surface area within the ring, and cable means having a first conductor connected to the outer surface at a location outside of the area enclosed by the ring and a second conductor which makes at least one wrap around a portion of the ring and terminates at an electrical connection to the outer surface area enclosed within the ring.

3. An electromagnetic antenna for use with a conducting surface comprising a sheet having a hole communicating to an outer surface of a conducting sheet having relatively low permeability, a pair of rings of relatively high permeability material attached to the outer surface in inductive relation thereto, thereby defining separate portions of outer surface area, the rings being coincident along a common portion which passes near the hole, and cable means having a looped conductor extending through the hole and forming at least one loop around the common portion of the high permeability rings.

4. An electromagnetic antenna comprising a metal conducting sheet having a relatively low alternating current surface resistance and having a hole between an inner surface and an outer surface, a ring of relatively high alternating current surface resistance material attached to the outer surface adjacent the hole and enclosing an area of the outer surface near the hole, the ring being in close electrical contact with the outer surface along the full length of the ring, and cable means having a first conductor connected to the outer surface adjacent the hole outside of the ring and a second conductor extending through the hole and connected to the outer surface at a point within the area enclosed by the ring.

References Cited

UNITED STATES PATENTS

| 2,508,085 | 5/1950 | Alford | 343—769 |
| 2,689,302 | 9/1954 | Albano | 343—845 |
| 2,740,113 | 3/1956 | Hemphill | 343—768 |

ELI LIEBERMAN, *Primary Examiner.*